(12) United States Patent
Pytlarz et al.

(10) Patent No.: US 10,600,166 B2
(45) Date of Patent: Mar. 24, 2020

(54) TONE CURVE MAPPING FOR HIGH DYNAMIC RANGE IMAGES

(71) Applicant: Dolby Laboratories Licensing Corporation, San Francisco, CA (US)

(72) Inventors: Jaclyn Anne Pytlarz, Sunnyvale, CA (US); Robin Atkins, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/486,392

(22) PCT Filed: Feb. 12, 2018

(86) PCT No.: PCT/US2018/017830
§ 371 (c)(1),
(2) Date: Aug. 15, 2019

(87) PCT Pub. No.: WO2018/152063
PCT Pub. Date: Aug. 23, 2018

(65) Prior Publication Data
US 2020/0005441 A1    Jan. 2, 2020

Related U.S. Application Data

(60) Provisional application No. 62/465,298, filed on Mar. 1, 2017, provisional application No. 62/459,141, filed on Feb. 15, 2017.

(30) Foreign Application Priority Data

Feb. 15, 2017 (EP) .................................. 17156284

(51) Int. Cl.
*G06T 5/00* (2006.01)

(52) U.S. Cl.
CPC .... *G06T 5/009* (2013.01); *G06T 2207/20208* (2013.01)

(58) Field of Classification Search
CPC .......... G06T 5/009; G06T 5/40; G06T 5/007; G06T 5/008; G06T 5/50; G06T 5/20;
(Continued)

(56) References Cited

U.S. PATENT DOCUMENTS 7,369,183 B2 * 5/2008 Oka ....................... H04N 5/202
348/672
8,593,480 B1   11/2013 Ballestad
(Continued)

FOREIGN PATENT DOCUMENTS

RU       2589857 C2    7/2016

OTHER PUBLICATIONS

SMPTE ST 2084:2014 "High Dynamic Range EOTF of Mastering Reference Displays", Society of Motion Picture and Television Engineers, 2014, 14 pages.
(Continued)

*Primary Examiner* — Michael S Osinski

(57) ABSTRACT

Methods for mapping an image from a first dynamic range to a second dynamic range are presented. The mapping is based on a function that includes two spline polynomials determined using three anchor points and three slopes. The first anchor N point is determined using the black point levels of the input and target output, the second anchor point is determined using the white point levels of the input and target output, and the third anchor point is determined using mid-tones information data for the input and target output. The mid-tones level of the target output is computed adaptively based on an ideal one-to-one mapping and by preserving input contrast in both the blacks and the highlights.
(Continued)

An example tone-mapping transfer function based on third order (cubic) Hermite splines is presented.

19 Claims, 6 Drawing Sheets

(58) Field of Classification Search
CPC . G06T 2207/20208; G06T 2207/10024; G06T 2207/10016; G06T 2207/20021; G06T 2207/20032; G06T 2207/20092; G09G 2320/0276; G09G 2320/066; G09G 2320/06; G09G 2320/0673; G09G 2320/0233; G09G 2340/06; G09G 2360/16; H04N 5/202; H04N 5/20; H04N 5/2355; H04N 9/68; H04N 9/77; H04N 9/69; H04N 1/6027
See application file for complete search history.

(56) References Cited

U.S. PATENT DOCUMENTS

| | | | | |
|---|---|---|---|---|
| 8,989,510 B2 * | 3/2015 | Muramatsu | ............. | G06T 5/008 382/255 |
| 9,805,663 B2 * | 10/2017 | Kawaguchi | .......... | G09G 3/3406 |
| 10,311,807 B2 * | 6/2019 | Chen | ...................... | G09G 3/006 |
| 10,380,725 B2 * | 8/2019 | Tatsumi | ................. | H04N 5/202 |
| 10,430,931 B2 * | 10/2019 | Rotte | ................... | H04N 5/2355 |
| 2004/0252133 A1 | 12/2004 | Vuylsteke | | |
| 2005/0280869 A1 * | 12/2005 | Kameyama | .............. | H04N 1/60 358/3.01 |
| 2006/0164524 A1 * | 7/2006 | Shibano | .................. | G06T 5/009 348/234 |
| 2007/0041636 A1 * | 2/2007 | Yoon | ....................... | G06T 5/009 382/169 |
| 2007/0229863 A1 * | 10/2007 | Ono | ........................ | G06T 5/008 358/1.9 |
| 2010/0329553 A1 * | 12/2010 | Shiokawa | .............. | H04N 5/202 382/167 |
| 2013/0155330 A1 | 6/2013 | Longhurst | | |
| 2014/0118423 A1 * | 5/2014 | Hasegawa | ............ | G09G 3/2003 345/690 |
| 2015/0215634 A1 | 7/2015 | Jia et al. | | |
| 2015/0358646 A1 * | 12/2015 | Mertens | ................ | H04N 1/6058 382/166 |
| 2016/0165256 A1 * | 6/2016 | Van Der Vleuten | ..... | H04N 9/68 375/240.01 |
| 2017/0272690 A1 * | 9/2017 | Seifi | ....................... | H04N 5/355 |
| 2017/0330529 A1 * | 11/2017 | Van Mourik | .......... | H04N 5/20 |
| 2018/0167597 A1 * | 6/2018 | Seifi | ........................ | G06T 5/009 |
| 2018/0336669 A1 * | 11/2018 | Mertens | .................. | G06T 5/007 |
| 2019/0052908 A1 * | 2/2019 | Mertens | ................ | H04N 19/186 |
| 2019/0311694 A1 * | 10/2019 | Van Mourik | .......... | H04N 19/46 |

OTHER PUBLICATIONS

Power,J. et al "Reproducing Color Images as Duotones" Computer Graphics Proc. Siggraph, ACM, New York, Aug. 1, 1996, pp. 237-248.

* cited by examiner a)

b)

TONE CURVE MAPPING FOR HIGH DYNAMIC RANGE IMAGES

CROSS-REFERENCE TO RELATED APPLICATIONS

This application claims the benefit of priority from U.S. Provisional Patent Application Ser. No. 62/459,141 and European Patent Application No. 17156284.6, both filed on Feb. 15, 2017, and U.S. Provisional Patent Application Ser. No. 62/465,298 filed on Mar. 1, 2017, each of which is incorporated herein by reference.

TECHNOLOGY

The present invention relates generally to images. More particularly, an embodiment of the present invention relates to determining parameters for a tone curve for mapping high-dynamic range (HDR) images and video signals from a first dynamic range to a second dynamic range.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image.

In practice, images comprise one or more color components (e.g., luma Y and chroma Cb and Cr) wherein each color component is represented by a precision of n-bits per pixel (e.g., n=8). Using linear luminance coding, images where n<8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). In general, without limitation, the methods of the present disclosure relate to any dynamic range higher than SDR.

High Dynamic Range (HDR) content authoring is now becoming widespread as this technology offers more realistic and lifelike images than earlier formats. However, many display systems, including hundreds of millions of consumer television displays, are not capable of reproducing HDR images. Furthermore, because of the wide range of HDR displays (say, from 1,000 nits to 5,000 nits or more) HDR content optimized on one HDR display may not be suitable for direct playback on another HDR display. One approach being used to serve the overall market is to create multiple versions of new video content; say, one using HDR images, and another using SDR (standard dynamic range) images. However, this requires content authors to create their video content in multiple formats, and may require consumers to know which format to buy for their specific display. A potentially better approach might be to create one version of content (in HDR), and use an image data transformation system (e.g., as part of a set-top box functionality) to automatically down-convert (or up-convert) the input HDR content to the appropriate output SDR or HDR content. To improve existing display schemes, as appreciated by the inventors here, improved techniques for determining a tone curve for display mapping of HDR images are developed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
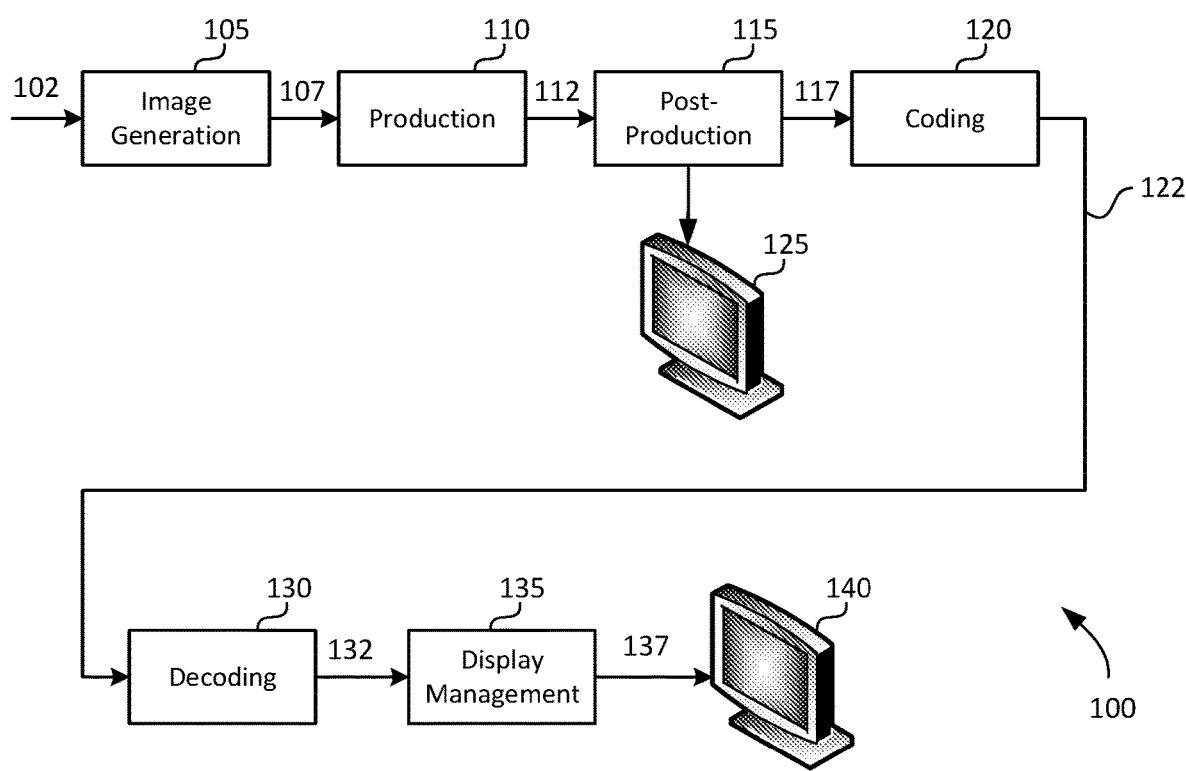
FIG. 1 depicts an example process for a video delivery pipeline.

Methods for determining a tone curve for display mapping of high dynamic range (HDR) images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to methods for determining a tone curve for display mapping of high dynamic range (HDR) images. In a video system, in one embodiment, for an input image, a processor receives first information data comprising an input black point level (x1, SMin), an input mid-tones level (x2, SMid), and an input white point level (x3, SMax) in a first dynamic range. The processor also accesses second information data for an output image in a second dynamic range comprising a first output black point level (TminPQ) and a first output white point level (TmaxPQ) in the second dynamic range. The processor determines an output mid-tones value in the second dynamic range based on the first and second information data. The processor computes a second output black point and a second output white point in the second dynamic range based on the second information data and the output mid-tones value. Then, it computes a tail slope, a head slope, and a mid-tones slope based on the first information data, the second information data, and the output mid-tones value. The processor determines a transfer function to map pixel values of the input image in the first dynamic range to corresponding pixel values of the output image in the second dynamic range, wherein the transfer function comprises two segments, wherein the first segment is determined based on the tail slope, the mid-tones slope, the input black point level, the input mid-tones level, the second output black point, and the output mid-tones value, and the second segment is determined based on the mid-tones slope, the head slope, the input mid-tones level, the input white point level, the output mid-tones value, and the second output white point. The processor maps the input image to the output image using the determined transfer function.

In an embodiment, the processor computes the second output black point and the second output white point based on the first information data, the second information data and the output mid-tones value.

In an embodiment, the processor computes a tail slope based on the input black point level, the input mid-tones level, the second output black point and the output mid-tones value.

In an embodiment, the processor computes a head slope based on the input white point level, the input mid-tones level, the second output white point and the output mid-tones value.

In an embodiment, the processor computes a mid-tones slope based on the first information data, the second output black point, the second output white point and the output mid-tones value.

Dynamic Range Conversion

Video Coding of HDR Signals

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Image Transformation Using a Sigmoid Mapping

In U.S. Pat. No. 8,593,480, "Method and apparatus for image data transformation," by A. Ballestad and A. Kostin, to be referred herein as the '480 Patent, which is incorporated herein by reference in its entirety, the inventors proposed an image transformation mapping using a parametrized sigmoid function that can be uniquely determined using three anchor points and a mid-tones free parameter. An example of such function is depicted in FIG. 2.

Figure 2:
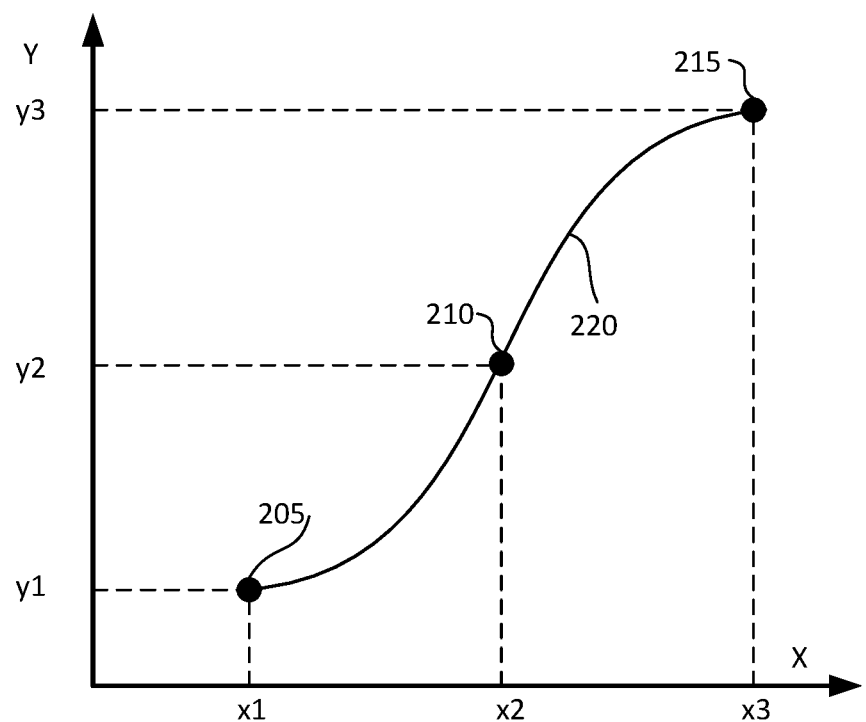
FIG. 2 depicts an example mapping function for mapping images from a first dynamic range to a second dynamic range using three anchor points according to prior art.

As depicted in FIG. 2, the mapping function (220) is defined by three anchor points (205, 210, 215): a black point (x1, y1), a mid-tones point (x2, y2), and a white point (x3,y3). This transformation has the following properties:

The values from x1 to x3 represent the range of possible values that describe the pixels that make up the input image. These values may be the brightness levels for a particular color primary (R, G, or B), or may be the overall luminance levels of the pixel (say the Y component in a YCbCr representation). Typically, these values correspond to the darkest (black point) and brightest (white point) levels supported by the display used to create the content (the "mastering display" (125)); however, in some embodiments, when the characteristics of the reference display are unknown, these values may represent minimum and maximum values in the input image (e.g., in R, G, or B, luminance, and the like), which can be either received via image metadata or computed in the receiver.

The values from y1 to y3 represent the range of possible values that describe the pixels that make up the output image (again either color primary brightness or overall luminance levels). Typically, these values correspond to the darkest (black point) and brightest (white point) levels supported by the intended output display (the "target display" (140)).

Any input pixel with the value x1 is constrained to map to an output pixel with the value y1, and any input pixel with the value x3 is constrained to map to an output pixel with the value y3.

The values of x2 and y2 represent a specific mapping from input to output that is used as an anchor point for some "midrange" (or mid-tones level) element of the image. Considerable latitude is permitted in the specific choice of x2 and y2, and the '480 Patent teaches a number of alternatives for how these parameters may be chosen.

Once the three anchor points have been chosen, the transfer function (220) may be described as $$y = \frac{C_1 + C_2 x^n}{1 + C_3 x^n}, \quad (1)$$

where $C_1$, $C_1$, and $C_3$ are constants, x denotes the input value for a color channel or luminance, y denotes the corresponding output value, and n is a free parameter that can be used to adjust mid-tone contrast.

As described in the '480 Patent, the $C_1$, $C_1$, and $C_3$ values may be determined by solving $$\begin{pmatrix} c_1 \\ c_2 \\ c_3 \end{pmatrix} = \frac{1}{x_3 y_3 (x_1 - x_2) + x_2 y_2 (x_3 - x_1) + x_1 y_1 (x_2 - x_3)} \begin{pmatrix} x_2 x_3 (y_2 - y_3) & x_1 x_3 (y_3 - y_1) & x_1 x_2 (y_1 - y_2) \\ (x_3 y_3 - x_2 y_2) & (x_1 y_1 - x_3 y_3) & (x_2 y_2 - x_1 y_1) \\ (x_3 - x_2) & (x_1 - x_3) & (x_2 - x_1) \end{pmatrix} \begin{pmatrix} y_1 \\ y_2 \\ y_3 \end{pmatrix}. \quad (2)$$

The tone curve of equation (1) has been applied successfully to a number of display mapping applications; however, as appreciated by the inventors, it has also a number of potential limitations, including:

- It is hard to define tone-curve parameters so that there is a one-to-one mapping within a specific range of the target display
- It is hard to determine parameters (say, exponent n) to control contrast
- Small changes in the mid-anchor (x2,y2) point may yield unexpected behavior
- Does not allow for a linear mapping below the black anchor point (205) and/or above the white anchor point (215)

Figure 3:
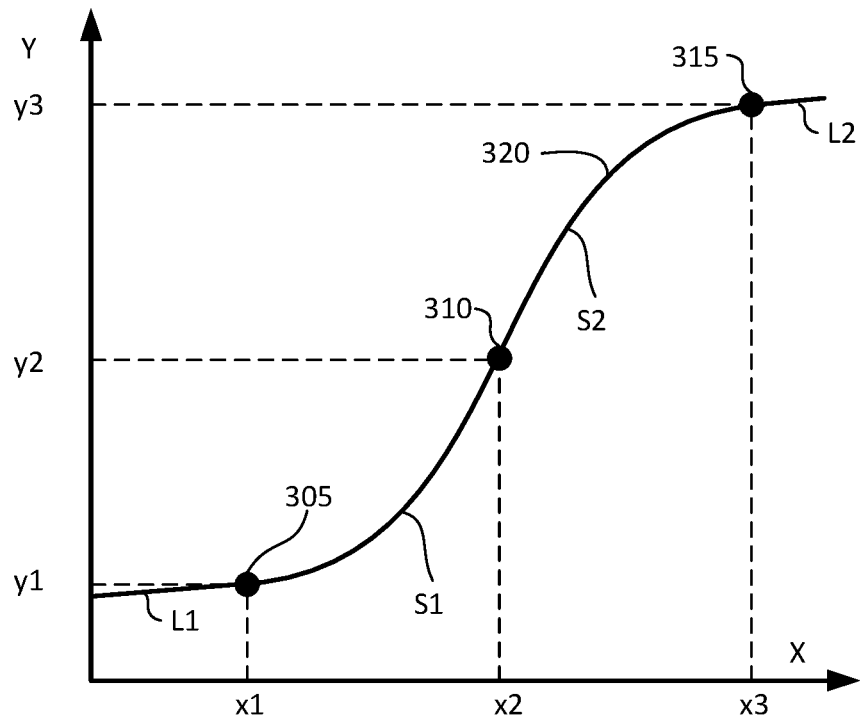
FIG. 3 depicts an example mapping function for mapping images from a first dynamic range to a second dynamic range according to an embodiment of the present invention.

FIG. 3 depicts an example of a new tone-mapping curve according to an embodiment. As depicted in FIG. 3, tone mapping curve (320) comprises up to four segments:

Optional linear segment L1, for values lower than (x1, y1) (x1 can be negative as well)
Spline S1, from (x1,y1) to (x2, y2)
Spline S2, from (x2, y2) to (x3,y3)
Optional linear segment L2, for values larger than (x3, y3) (x1 can be larger than 1 as well)

In an embodiment, without limitation, segments S1 and S2 are determined using a third-order (cubic) Hermite polynomial.

As will be discussed later on, the mappings using linear segments L1 and L2 may be particularly useful when one computes the inverse of the tone curve, for example, during inverse tone mapping, say, when one needs to generate a high dynamic range image from a standard dynamic range image.

As in equation (1), curve (320) is controlled by three anchor points (305, 310, 315): a black point (x1, y1), a mid-tones value point (x2, y2), and a white point (x3, y3). In addition, each of the spline segments can be further constrained by two slopes, at each end-point; thus the full curve is controlled by three anchor points and three slopes: the tail slope at (x1,y1), the mid-tones slope at (x2,y2), and the head slope at (x3,y3).

As an example, consider a spline determined between points (x1,y1) and (x2,y2), with slope s1 at (x1,y1) and slope s2 at (x2,y2), then, for an input x the transfer function for that cubic Hermite spline may be defined as:

$$y = ((2T^3 - 3T^2 + 1)*y_1 + (T^3 - 2T^2 + T)*(x_2 - x_1)*s_1 + (-2T^3 + 3T^2)*y_2 + (T^3 - T^2)*(x_2 - x_1)*s_2), \quad (3a)$$

where $$T = (x - x_1)/(x_2 - x_1). \quad (3b)$$

In an embodiment, to ensure no over- or under-shooting (that is, to ensure that the curve is monotonic), the following rule may also be applied to slopes s1 and s2:

$$\text{slope} \leq \alpha \frac{\Delta y}{\Delta x}, \quad (4)$$

where α denotes a constant (e.g., α=3).

Given the Hermite spline of equation (3), in an embodiment, without limitation, for a video input, say encoded using a perceptual quantizer (PQ) (e.g., according to SMPTE ST 2084:2014, "High Dynamic Range EOTF of Mastering Reference Displays"), the complete curve may be defined based on the following parameters:

SMin=x1; denotes the minimum luminance of the source content. If not given, SMin may be set to a value representing typical blacks (e.g., SMin=0.0151)

SMax=x3; denotes the maximum luminance of the source content. If not given, SMax may be set to a large value representing "highlights" (e.g., SMax=0.9026)

SMid=x2; denotes the average (e.g., arithmetic, median, geometric) luminance of the source content. In some embodiments, it may simply denote an "important" luminance feature in the input picture. In some other embodiment it may also denote the average or median of a selected region (say, a face). SMid may be defined manually or automatically and its value may be offset based on preferences to retain a certain look in highlights or shadows. If not given, SMid may be set to a typical average value (e.g., SMid=0.36, representing skin tones).

These data may be received using image or source metadata, they may be computed by a display management unit (e.g., 135), or they may be based on known assumptions about the mastering or reference display environment. In addition, the following data are assumed to be known for the target display (e.g., received by reading the display's Extended Display Identification Data (EDID)):

TminPQ=the minimum luminance of the target display

TmaxPQ=the maximum luminance of the target display where the term 'PQ,' as used herein, denotes that these values (typically given in nits) are converted to PQ values according to SMPTE ST 2084.

To fully determine the mapping curve, the following points and parameters need to be computed:

TMin=y1;
TMax=y3;
TMid=y2;
slopeMin=slope at (x1,y1);
slopeMid=slope at (x2,y2); and
slopeMax=slope at (x3, y3).

Figure 4A:
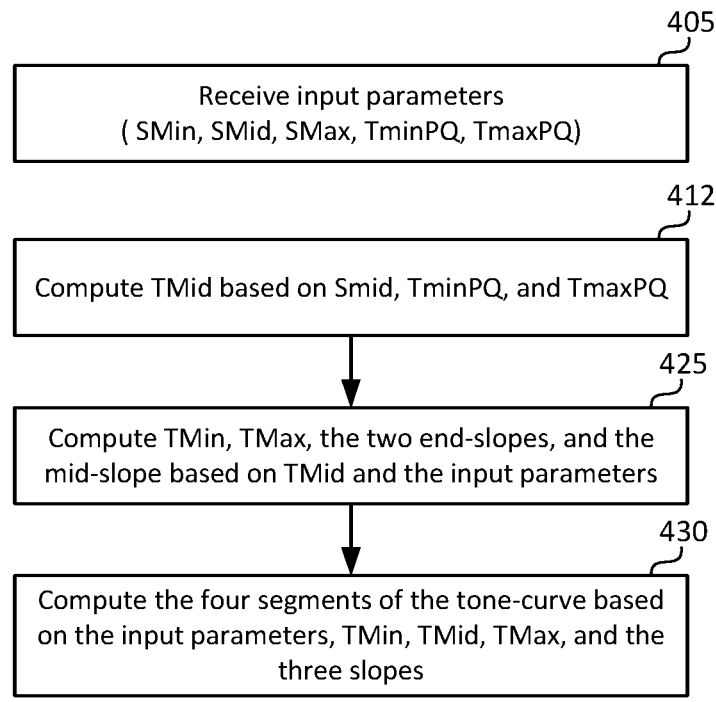
FIG. 4A and FIG. 4B depict example processes for determining the tone-mapping function according to embodiments of the present invention.

FIG. 4A depicts an example process for determining the anchor points and the slopes of the tone-mapping curve according to an embodiment. Given the input parameters (405) SMin, SMid, SMax, TminPQ, and TmaxPQ, step 412 computes y2 (TMid). For example, in one embodiment, the mid-tones anchor point (SMid, TMid) may be selected to be on the 1-to-1 mapping line, that is, forcing TMid=SMid, as long as TMid is within the boundary points TminPQ and TmaxPQ and a predetermined buffer. For TMid values close to TminPQ and TmaxPQ, TMid may be selected to be within a fixed distance (e.g., between TMinPQ+c and TmaxPQ-d, where c and d are fixed values), or a distance computed as a percentage of these values. For example, TMid may be forced to never be below TminPQ+a*TminPQ or above TmaxPQ-b*TMaxPQ, where a and b are constants in [0, 1], representing percentage values (e.g., a=b=5%=0.05).

Given TMid, step 425 computes the remaining unknown parameters (e.g., y1, y2, and the three slopes). Finally, step 430 computes the two spline segments and the two linear segments.

Figure 4B:
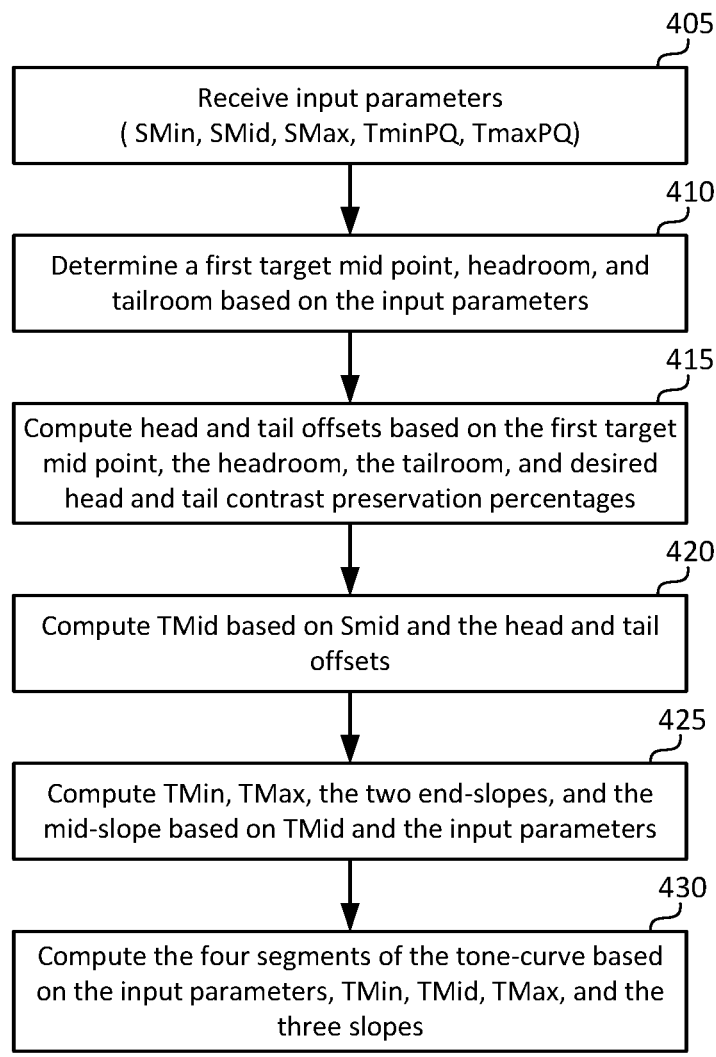

In another embodiment, computing TMid may be further refined by attempting to preserve the original ratios between the input "tail-contrast" (that is, the contrast between the blacks (SMin) and the mid-tones (SMid)) and the input "head contrast" (that is, the contrast between the mid-tones (SMid) and the highlights (SMax)). An example of such a process according to an embodiment is depicted in FIG. 4B and also described in pseudocode in Table 1. The goal of this process is:

- To determine the output mid-tones anchor point (SMid, TMid) to be as close as possible to the diagonal (1-to-1) mapping. That is, ideally, TMid should be as close as possible to SMid to preserve the input mid-tones;
- If a 1-to-1 mapping is not possible, then determine TMid so that output values of the "tail contrast" and "head contrast" ranges are within predetermined limits of the corresponding input ranges. As used herein, the input "head contrast" is based on a function of (SMax-SMid), and the input "tail contrast" is based on a function of (SMid-SMin).
- Given the middle anchor point (x2, y2) or (SMid, TMid), determine the three slopes so that the whole tone curve can be characterized.

TABLE 1

Example process for determining tone curve parameters

1) Find the dynamic range of the target display
   TDR = TmaxPQ−TminPQ;
2) Find where the source midpoint (SMid), source head contrast (the SMid to SMax range), and source tail contrast (the SMin to TABLE 1-continued Example process for determining tone curve parameters SMid range) are located in the target dynamic range;
   midLoc = (SMid−TminPQ) /TDR;
   headroom = (SMax−SMid) /TDR;
   tailroom = (SMid−SMin) /TDR;
3) Set the amount of contrast preservation (e.g., how much of the input dynamic range in highlights - head contrast - and shadows -tail contrast - should be preserved) (e.g., 50% for both)
   preservationHead = 0.5;
   preservationTail = 0.5;
4) Calculate the Head and Tail offsets of SMid based on midLoc and the amount of contrast preservation. The offsetHead value attempts to push TMid down while offsetTail attempts to push TMid up to preserve contrast while being as close as possible to a 1-to-1 mapping between SMid and TMid.
   offsetScalar = −0.5 * (cos(pi*min(1,max(0,(midLoc-0.5)/ 0.5) ) ) − 1) ;
   offsetHead = max(0, headroom*preservationHead + midLoc − 1) * TDR * offsetScalar;
   offsetScalar = −0.5 * (cos(pi*min(1,max(0,1-midLoc*2) ) ) − 1) ;
   offsetTail = max(0, tailroom*preservationTail − midLoc) * TDR * offsetScalar;
5) Set TMid (y2) equal to SMid and add the Head and Tail offsets
   TMid = SMid−offsetHead+offsetTail;
6) Adjust TMin (y1) and TMax (y3) points based on TMid
   TMax = min(TMid+SMax−SMid,TmaxPQ) ;
   TMin = max(TMid−SMid+SMin,TminPQ) ;
7) Calculate the maximum tail and head slopes based on the overshoot rule (see equation (4)) to preserve monotonicity
   maxMinSlope = 3* (TMid−TMin) / (SMid − SMin) ;
   maxMaxSlope = 3* (TMax−TMid) / (SMax − SMid) ;
8) Calculate the slopes. Typically, contrastFactor =1; however, its value may be adjusted to further change the output signal contrast based on user preferences (e.g., using the "contrast" control on a TV set)
   slopeMin = min ( [maxMinSlope, ( ( TMid − TMin) / (SMid − SMin) ) ^2] ) ;
   slopeMax = min ( [maxMaxSlope,1, ( (TMax − TMid) / (SMax − SMid) ) ^4] ) ;
   slopeMid = min ( [maxMinSlope,maxMaxSlope,contrastFactor* (1− SMid+TMid) ] ) ;

In step 4, above, to compute the head and tail offset parameters, terms are multiplied by a term denoted as "offsetScalar," which, in an embodiment, can be expressed as $$offsetScalar = \qquad (5)$$
$$s(midLoc) = -\left(\frac{1}{2}\right)(\cos(\pi * \min(1, \max(0, |2*midLoc - 1|))) - 1).$$

The purpose of this function is to provide a smooth transition between the maximum possible offsets (e.g., headroom*preservationHead or tailroom*preservationTail) and the corresponding head or tail slopes. The s( ) function in equation (5) can be any suitable linear or non-linear function of |2*midLoc−1|. For example, in another embodiment:

$$s(midLoc)=(1,\max(0,|2*midLoc-1|)). \qquad (6)$$

In step 8, above, slopeMid is computed to be as close to the diagonal for a 1-to-1 mapping. In contrast, slopeMax is computed to preserve the highlights proportionally to head-slope$^h$ (e.g., h=4); that is the slope between (x2, y2) and (x3, y3), while slopeMin is computed to preserve the blacks proportionally to tailslope$^t$ (e.g., t=2) that is the slope between (x1, y1) and (x2, y2). The exponents h and t determine how fast the highlights or grays need to be "crashed." Typical values for h and t include 1, 2, or 4. In an embodiment, h=t.

Given the three anchor points and the three slopes, the four segments may be generated as follows:
if (SMin<x<SMid)//S1 Curve $$y=((2T^3-3T^2+1)*T\text{Min}+(T^3-2T^2+T)*(S\text{Mid}-S\text{Min})*\text{slopeMin}+(-2T^3+3T^2)*T\text{Mid}+(T^3-T^2)*(S\text{Mid}-S\text{Min})*\text{slopeMid}), \quad (7a)$$

where $$T=(x-S\text{Min})/(S\text{Mid}-S\text{Min}). \quad (7b)$$

if (SMid<x<SMax)//S2 curve $$y=((2T^3-3T^2+1)*T\text{Mid}+(T^3-2T^2+T)*(S\text{Max}-S\text{Mid})*\text{slopeMid}+(-2T^3+3T^2)*T\text{Max}+(T^3-T^2)*(S\text{Max}-S\text{Mid})*\text{slopeMax}), \quad (7c)$$

where $$T=(x-S\text{Mid})/(S\text{Max}-S\text{Mid}). \quad (7d)$$

if (x<SMin)//L1 segment $$y=T\text{Min}+(x-S\text{Min})*\text{slopeMin} \quad (7e)$$

if (x>SMax)//L2 Segment $$y=T\text{Max}+(x-S\text{Max})*\text{slopeMax} \quad (7f)$$

Returning to FIG. 4B, given input parameters (405) (e.g., SMin, SMid, SMax, TminPQ, and TmaxPQ), step (410) computes a first target mid-tones value and associated target headroom and tailroom values based on the input parameters (e.g., see step 2 in Table 1). Given head and tail contrast preservation percentages (e.g., about 50%), the first target mid-tones value, and the associated target headroom and tailroom, step (415) computes head and tail offsets (e.g., see step 4 in Table 1). Step (420), applies the head and tail offsets to the input SMid value to compute the target TMid value (e.g., see step 5 in Table 1). Next, step (425) computes TMax and TMin based on the input parameters and TMid (e.g., see step 6 in Table 1). Step (425) computes also the two end-slopes and the mid-slope for the two splines (e.g., see step 8 in Table 1) while trying to preserve monotonicity. Given the input parameters, TMid, TMin, TMax, and the three slopes, one then can apply equation (7) to compute in step (430) the tone-mapping curve.

Figure 5:
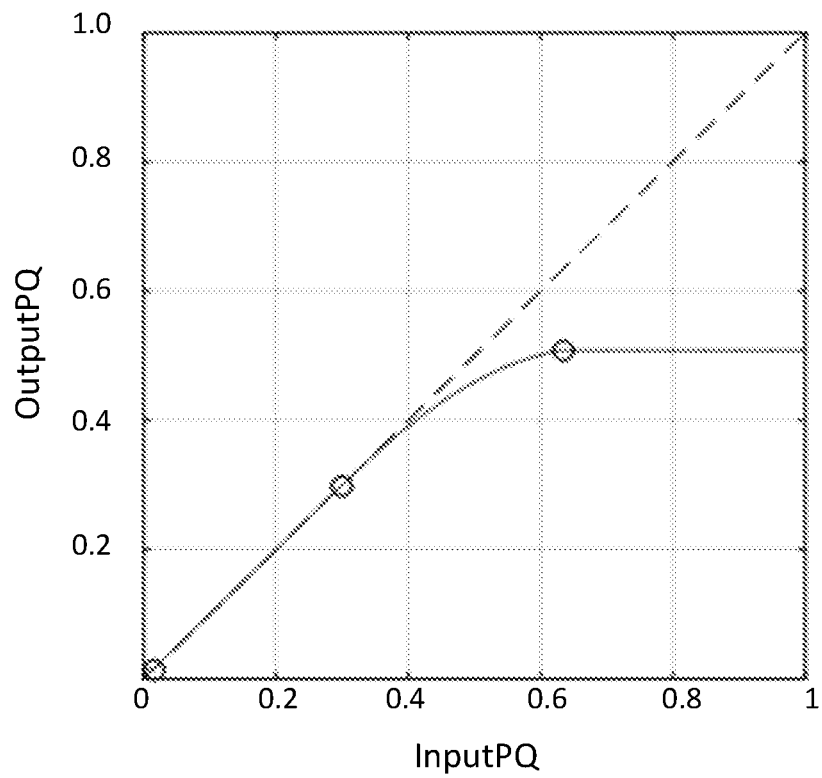
FIG. 5 depicts two example mapping functions determined according to embodiments of the present invention.
Figure 5:
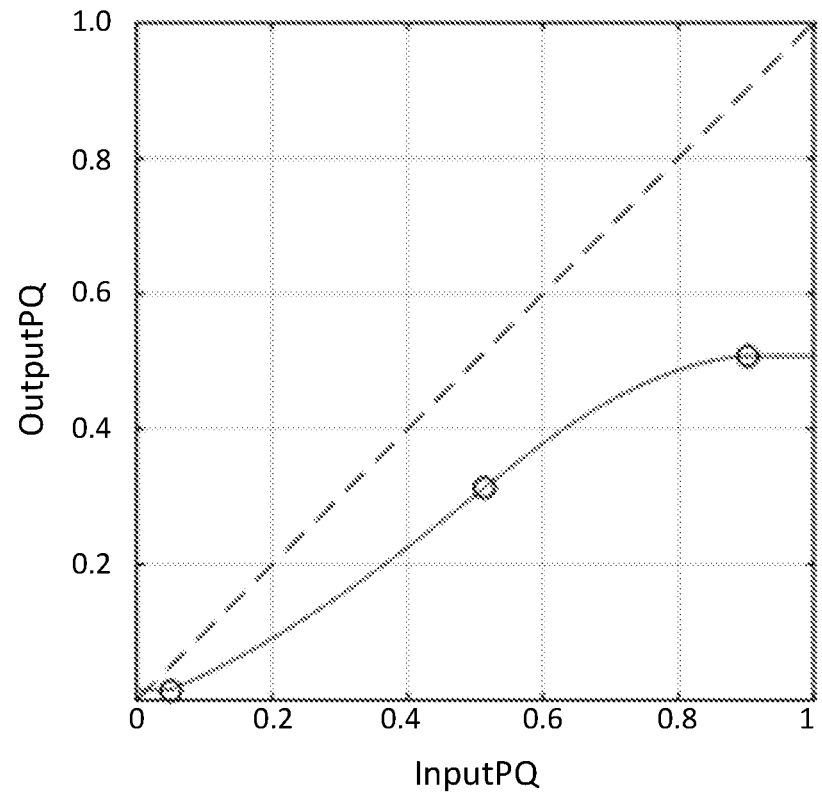

FIG. 5 depicts two different examples of the proposed tone curve, mapping PQ-coded data from a first dynamic range to a second, lower, dynamic range. Note that the same curve may also be used for an inverse mapping, say, for translating the data from a lower dynamic range range back to the original high dynamic range. In an embodiment, the inverse mapping may be computed as follows:

Derive the tone-mapping curve, say, expressed as y=f(x), as described earlier

Generate a forward look-up table, mapping input $x_i$ values to output $y_i$ values using $y_i=f(x_i)$ Generate a backward look-up table, mapping input low dynamic range values $y_k'$ to output higher dynamic range values $x_k'$, using the values from the forward LUT (that is, if $y_k'=y_k'$, then $x_k'=x_i$)

Generate additional values of the backward LUT by interpolating over the existing values. For example, if $y_i<y_k'<y_{i+1}$, then the corresponding output $x_k'$ can be generated by interpolating between $x_i$ and $x_{i+1}$.

Figure 6A:
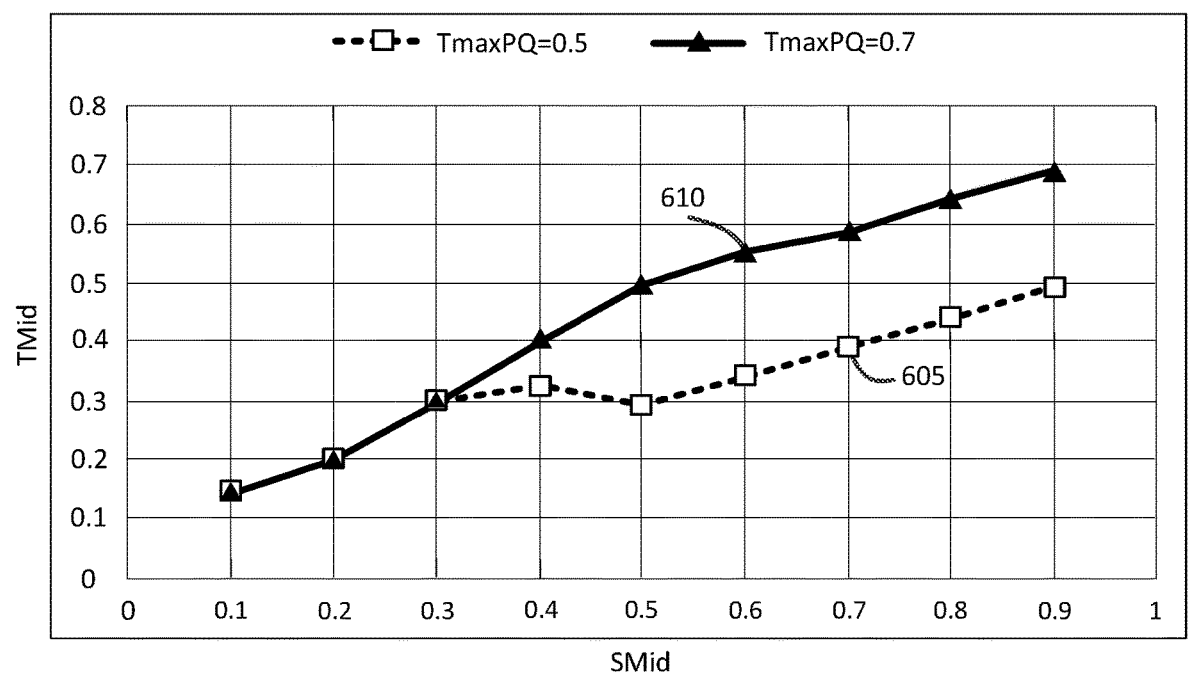
FIG. 6A and FIG. 6B depict example plots showing how input mid-tones values are mapped to output mid-tones values to determine the mid-tones anchor point of a tone-curve mapping function according to embodiments of the present invention.

FIG. 6A depicts an example plot showing how input mid-tones values (SMid) are mapped to output mid-tones values (TMid) to determine (e.g., using steps 1 to 4 in Table 1) the mid-tones anchor point of the tone-curve mapping function according to an embodiment. Given SMin=0.01, SMax=0.92, and TminPQ=0.1, plot 605 depicts how SMid is mapped to TMid when TmaxPQ=0.5, and plot 610 depicts how SMid is mapped to TMid when TmaxPQ=0.7.

From FIG. 6A, one observes that within a small range of SMid values function 605 is not monotonic, which may yield unexpected results, say, during fade-ins or fade outs. To address this issue, in step 4 of Table 1, the following pseudocode may be used instead to compute the head and tail offsets:

```
cutoff = a;// e.g. a = 0.5.
offsetHead = min(max(0, (midLoc − cutoff))*TDR,
    max(0,headroom*preservationHead + midLoc − 1) * TDR);
offsetTail = min(max(0, (cutoff − midLoc))*TDR,
    max(0, tailroom*preservationTail − midLoc) * TDR);
``` where cutoff is a variable that prioritizes the maintenance of highlights versus shadows by specifying the percentage of the target dynamic range where the head and tail offsets will be clipped to. For example, a cutoff value of 0.5 gives equal prioritization to highlights and shadows, whereas a cutoff value of 0.7 gives higher prioritization to highlights than to shadows.

Figure 6B:
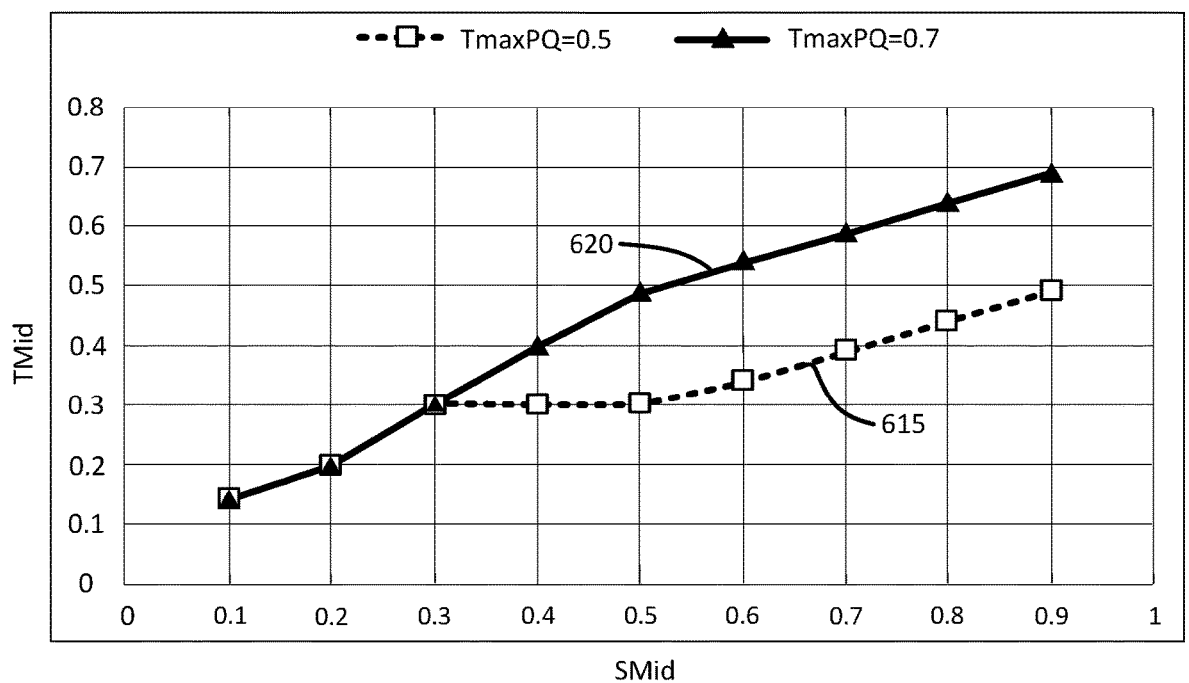

This approach is both computationally simpler, since it does not require computing either cosine or square root functions, and, as depicted in FIG. 6B, it preserves monotonicity. Given SMin=0.01, SMax=0.92, and TminPQ=0.1, in FIG. 6B, plot 615 depicts how SMid is mapped to TMid when TmaxPQ=0.5, and plot 620 depicts how SMid is mapped to TMid when TmaxPQ=0.7.

Compared to equation (1), the proposed tone curve exhibits multiple advantages, including:

Using the slopeMid parameter, one may define a one-to-one mapping between SMid and TMid values within a specific range of the target display to preserve contrast;

Image contrast can be explicitly controlled via slopeMid and the contrastFactor variable (see, Table 1, step 8). For example, in an embodiment, the value of contrastFactor may range, without limitation, between 0.5 and 2.0, with a default value of contrastFactor=1;

By splitting the whole curve into two splines, there is no more unexpected behavior around the mid-tones anchor (x2, y2);

Using SlopeMin and SlopMax one can predetermine the behavior of the mapping curve before the black anchor and after the white anchor points;

This curve can map negative input values (e.g., x<0). Such a condition may occur due to noise or other system conditions (e.g., spatial filtering). One typically clamps negative values to 0; however, such clamping may end up increasing the noise and reducing overall quality. By being able to map negative input values, such clipping-based artifacts may be reduced or eliminated.

The tone-mapping curve can easily be inverted by a simple switching of the x to y mapping to a y to x mapping;

There is no requirement to use any non-integer exponential or power functions, so computations are faster and more efficient, since no non-integer exponents are ever used.

Regarding the last point, from a computational point of view, determining the function parameters in equation (2) for a non-trivial contrast value (e.g., n≠1 and/or when n is not an integer) requires using six power functions (e.g., for $y=\text{pow}(x,n)$, $y=x^n$). In contrast, the computations in Table 1 never require any non-integer power functions (computing powers of 2 or 4 requires simple multiplications). Overall, compared to equation (1), equation (7) requires a few more multiply/divide and add/subtract operations per input sample, but requires no power functions. In some embodiments, equation (7) may be implemented using a table look up. More importantly, user studies performed by the inventors seem to indicate that users prefer the overall picture quality of images generated using the new tone mapping function (320).

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to image transformations for images with high dynamic range, such as those described herein. The computer and/or IC may compute any of a variety of parameters or values that relate to image transformation processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to image transformations for HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient image transformation of HDR video to SDR video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method to map using a processor an image from a first dynamic range to a second dynamic range, the method comprising:

accessing first information data for an input image in the first dynamic range comprising an input black point level (x1, SMin), an input mid-tones level (x2, SMid), and an input white point level (x3, SMax) in the first dynamic range;

accessing second information data for an output image in the second dynamic range comprising a first output black point level (TminPQ) and a first output white point level (TmaxPQ) in the second dynamic range;

determining an output mid-tones value in the second dynamic range based on the first information data and the second information data;

computing a second output black point and a second output white point in the second dynamic range based on the second information data and the output mid-tones value;

computing a tail slope, a head slope, and a mid-tones slope based on the first information data, the second information data, and the output mid-tones value;

determining a transfer function to map pixel values of the input image in the first dynamic range to corresponding pixel values of the output image in the second dynamic range, wherein the transfer function comprises two segments, wherein the first segment is determined based on the tail slope, the mid-tones slope, the input black point, the input mid-tones level, the second output black point, and the output mid-tones value, and the second segment is determined based on the mid-tones slope, the head slope, the input mid-tones level, the input white point, the output mid-tones level, and the second output white point; and mapping the input image to the output image using the determined transfer function.

EEE 2. The method of EEE 1, wherein the first dynamic range comprises a high dynamic range and the second dynamic range comprises a standard dynamic range.

EEE 3. The method of EEE 1 or EEE 2, wherein the transfer function further comprises a first linear segment for input values lower than the input black point in the first dynamic range, wherein the linear segment has a slope equal to the tail slope.

EEE 4. The method of EEE 3, wherein the transfer function for the first linear segment comprises $$y = T\text{Min} + (x - S\text{Min}) * \text{slopeMin},$$

wherein x denotes an input pixel value, y denotes an output pixel value, slopeMin denotes the tail slope, TMin denotes the second output black point in the second dynamic range, and SMin denotes the input black point in the first dynamic range.

EEE 5. The method of any of the EEEs 1-4, wherein the transfer function further comprises a second linear segment for input values larger the input white point in the first dynamic range, wherein the linear segment has a slope equal to the head slope.

EEE 6. The method of EEE 5, wherein the transfer function for the second linear segment comprises $$y=T\text{Max}+(x-S\text{Max})*\text{slopeMax},$$

wherein x denotes an input pixel value, y denotes an output pixel value, slopeMax denotes the head slope, TMax denotes the second output white point in the second dynamic range, and SMax denotes the input white point in the first dynamic range.

EEE 7. The method of any of the EEEs 1-6, wherein the first segment and/or the second segment are determined based on a third-order Hermite spline polynomial.

EEE 8. The method of EEE 7, wherein determining the first segment comprises computing $$y=((2T^3-3T^2+1)*T\text{Min}+(T^3-2T^2+T)*(S\text{Mid}-S\text{Min})* \text{slopeMin}+(-2T^3+3T^2)*T\text{Mid}+(T^3-T^2)*(S\text{Mid}- S\text{Min})*\text{slopeMid}),$$

wherein T=(x−SMin)/(SMid−SMin), x denotes an input pixel value, y denotes an output pixel value, slopeMin denotes the tail slope, slopeMid denotes the mid-tones slope, TMin and TMid denote the second output black point and the output mid-tones level, and SMin and SMid denote the input black point and the input mid-tones level in the first dynamic range.

EEE 9. The method of EEE 7 or EEE 8, wherein determining the second segment comprises computing $$y=((2T^3-3T^2+1)*T\text{Mid}+(T^3-2T^2+T)*(S\text{Max}-S\text{Mid})* \text{slopeMid}+(-2T^3+3T^2)*T\text{Max}+(T^3-T^2)*(S\text{Max}- S\text{Mid})*\text{slopeMax}), \quad (5c)$$

wherein T=(x−SMid)/(SMax−SMid), x denotes an input pixel value, y denotes an output pixel value, slopeMax denotes the head slope, slopeMid denotes the mid-tones slope, TMid and TMax denote the output mid-tones level and the second output white point in the second dynamic range, and SMid and SMax denote the input mid-tones level and the input white point in the first dynamic range.

EEE 10. The method of any of the EEEs 1-9, wherein computing the output mid-tones value comprises computing:

if SMid<TminPQ+a*TMinPQ
    then TMid=TMinPQ+a*TMinPQ;
    else if SMid>TmaxPQ−b*TmaxPQ
    then TMid=TmaxPQ−b*TmaxPQ;
    else TMid=SMid;

wherein TMid denotes the output mid-tones value, a and b are percentile values in [0, 1], SMid denotes the input mid-tones level, and TminPQ and TmaxPQ comprise values in the second information data.

EEE 11. The method of any of the EEEs 1-9, wherein computing the output mid-tones value further comprises:

determining a preliminary output mid-tones value in the second dynamic range, and first and second bounding values for the preliminary output mid-tones value, based on the first information data and the first output black point;

computing a head offset and a tail offset in the second dynamic range based on the preliminary output mid-tones value, the first and a second bounding values, and one or more input contrast preservation values; and computing the output mid-tones value in the second dynamic range based on the input mid-tones level in the first dynamic range and the head and tail offsets.

EEE 12. The method of EEE 11, wherein determining the preliminary output mid-tones value and the first and second bounding values for the first output mid-tones value, comprises computing $$\text{midLoc}=(S\text{Mid}-T\text{min}PQ)/TDR;$$

$$\text{headroom}=(S\text{Max}-S\text{Mid})/TDR;$$

$$\text{tailroom}=(S\text{Mid}-S\text{Min})/TDR;$$

wherein $$TDR=T\text{max}PQ-T\text{min}PQ,$$

midLoc denotes the preliminary output mid-tones value, tailroom and headroom denote the first and second bounding values for the first output mid-tones value, SMin, SMid, and SMax denote the first information data, and TminPQ denotes the first output black point level.

EEE 13. The method of EEE 11 or EEE 12, wherein at least one contrast preservation value is approximately 50%.

EEE 14. The method of any of the EEEs 11-13, wherein computing the output mid-tones value (TMid) comprises computing $$T\text{Mid}=S\text{Mid}-\text{offsetHead}+\text{offsetTail},$$

wherein SMid denotes the input mid-tones level in the first dynamic range, and offsetHead and offsetTail denote the head and tail offsets.

EEE 15. The method of EEE 14, wherein computing the second output white point and the second output black point in the second dynamic range comprises computing $$T\text{Max}=\min(T\text{Mid}+S\text{Max}-S\text{Mid},T\text{max}PQ),$$

$$T\text{Min}=\max(T\text{Mid}-S\text{Mid}+S\text{Min},T\text{min}PQ,$$

wherein TMin denotes the second output black point, TMax denotes the second output white point, SMin and SMax denote the input black point and the input white point in the first dynamic range, and TminPQ and TmaxPQ denote the first output black point and the first output white point in the second dynamic range.

EEE 16. The method of EEE 10 or EEE 15, further comprising computing a maximum value of the tail slope (maxMinSlope) and/or a maximum value of the head slope (maxMaxSlope) as $$\text{maxMinSlope}=3*(T\text{Mid}-T\text{Min})/(S\text{Mid}-S\text{Min}),$$

$$\text{maxMaxSlope}=3*(T\text{Max}-T\text{Mid})/(S\text{Max}-S\text{Mid}).$$

EEE 17. The method of EEE 16, wherein computing the tail slope (slopeMin), the mid-tones slope (slopeMid), and the head slope (slopeMax) further comprises computing $$\text{slopeMin}=\min([\text{maxMinSlope},((T\text{Mid}-T\text{Min})/(S\text{Mid}- S\text{Min}))^2]);$$

$$\text{slopeMax}=\min([\text{maxMaxSlope},1,((T\text{Max}-T\text{Mid})/ (S\text{Max}-S\text{Mid}))^4]);$$

$$\text{slopeMid}=\min([\text{maxMinSlope},\text{maxMaxSlope},\text{contrastFactor}*(1-S\text{Mid}+T\text{Mid})]);$$

wherein contrastFactor denotes a contrast parameter.

EEE 18. The method of any of the EEEs 1-17, further comprising determining a backward look-up table to map an image from the second dynamic range back to the first dynamic range, the method comprising:

determining a forward look-up table mapping a plurality of x(i) values in the first dynamic range to y(i) values in the second dynamic range based on the determined transfer function; and generating the backward look-up table mapping a plurality of y'(k) values in the second dynamic range to corresponding x'(k) values in the first dynamic range by setting:
if y'(k)=y(i), then x'(k)=x(i)
otherwise
if y(i)<y'(k)<y(i+1), then the corresponding output x'(k) is generated by interpolating a value between x(i) and x(i+1).

EEE 19. An apparatus comprising a processor and configured to perform any one of the methods recited in EEEs 1-18.

EEE 20. A non-transitory computer-readable storage medium having stored thereon computer-executable instruction for executing a method with one or more processors in accordance with any one of the EEEs 1-18.

The invention claimed is:

1. A method to map using a processor an image from a first dynamic range to a second dynamic range, the method comprising:
   accessing first information data for an input image in the first dynamic range, the first information data comprising an input black point level (x1, SMin), an input mid-tones level (x2, SMid), and an input white point level (x3, SMax) in the first dynamic range;
   accessing second information data for an output image in the second dynamic range, the second information data comprising a first output black point level (TminPQ) and a first output white point level (TmaxPQ) in the second dynamic range;
   determining an output mid-tones value in the second dynamic range based on the first information data and the second information data;
   computing a second output black point and a second output white point in the second dynamic range based on the second information data and the output mid-tones value;
   computing a tail slope, a head slope, and a mid-tones slope based on the first information data, the second information data, and the output mid-tones value;
   determining a transfer function to map pixel values of the input image in the first dynamic range to corresponding pixel values of the output image in the second dynamic range, wherein the transfer function comprises two segments, wherein the first segment is determined based on the tail slope, the mid-tones slope, the input black point level, the input mid-tones level, the second output black point, and the output mid-tones value, and the second segment is determined based on the mid-tones slope, the head slope, the input mid-tones level, the input white point level, the output mid-tones value, and the second output white point; and
   mapping the input image to the output image using the determined transfer function.

2. The method of claim 1, wherein computing the second output black point and the second output white point in the second dynamic range is further based on the first information data.

3. The method of claim 1, wherein:
   computing the tail slope is based on the input black point level, the input mid-tones level, the second output black point and the output mid-tones value;
   computing the head slope is based on the input white point level, the input mid-tones level, the second output white point and the output mid-tones value; and
   computing the mid-tones slope is based on the first information data, the second output black point, the second output white point and the output mid-tones value.

4. The method of claim 1, wherein the first dynamic range comprises a high dynamic range and the second dynamic range comprises a standard dynamic range.

5. The method of claim 1, wherein the transfer function further comprises a first linear segment for input values lower than the input black point level in the first dynamic range, wherein the linear segment has a slope equal to the tail slope, wherein optionally the transfer function for the first linear segment comprises $$y=T\text{Min}+(x-S\text{Min})^*\text{slopeMin},$$

wherein x denotes an input pixel value, y denotes an output pixel value, slopeMin denotes the tail slope, TMin denotes the second output black point in the second dynamic range, and SMin denotes the input black point level in the first dynamic range.

6. The method of claim 1, wherein the transfer function further comprises a second linear segment for input values larger than the input white point level in the first dynamic range, wherein the linear segment has a slope equal to the head slope, wherein optionally the transfer function for the second linear segment comprises $$y=T\text{Max}+(x-S\text{Max})^*\text{slopeMax},$$

wherein x denotes an input pixel value, y denotes an output pixel value, slopeMax denotes the head slope, TMax denotes the second output white point in the second dynamic range, and SMax denotes the input white point level in the first dynamic range.

7. The method of claim 1, wherein the first segment and/or the second segment are determined based on a third-order Hermite spline polynomial.

8. The method of claim 7, wherein determining the first segment comprises computing $$y=((2T^3-3T^2+1)^*T\text{Min}+(T^3-2T^2+T)^*(S\text{Mid}-S\text{Min})^*\text{slopeMin}+(-2T^3+3T^2)^*T\text{Mid}+(T^3-T^2)^*(S\text{Mid}-S\text{Min})^*\text{slopeMid}),$$

wherein T=(x−SMin)/(SMid−SMin), x denotes an input pixel value, y denotes an output pixel value, slopeMin denotes the tail slope, slopeMid denotes the mid-tones slope, TMin and TMid denote the second output black point and the output mid-tones value, and SMin and SMid denote the input black point level and the input mid-tones level in the first dynamic range.

9. The method of claim 7, wherein determining the second segment comprises computing $$y=((2T^3-3T^2+1)^*T\text{Mid}+(T^3-2T^2+T)^*(S\text{Max}-S\text{Mid})^*\text{slopeMid}+(-2T^3+3T^2)^*T\text{Max}+(T^3-T^2)^*(S\text{Max}-S\text{Mid})^*\text{slopeMax}), \quad (5c)$$

wherein T=(x−SMid)/(SMax−SMid), x denotes an input pixel value, y denotes an output pixel value, slopeMax denotes the head slope, slopeMid denotes the mid-tones slope, TMid and TMax denote the output mid-tones value and the second output white point in the second dynamic range, and SMid and SMax denote the input mid-tones level and the input white point level in the first dynamic range.

10. The method of claim 1, wherein computing the output mid-tones value comprises computing:
   if SMid<TminPQ+a*TMinPQ
      then TMid=TMinPQ+a*TMinPQ;
   else if SMid>TmaxPQ−b*TmaxPQ
      then TMid=TmaxPQ−b*TmaxPQ;
   else TMid=SMid;
wherein TMid denotes the output mid-tones value, a and b are percentile values in [0, 1], SMid denotes the input mid-tones level, and TminPQ and TmaxPQ comprise values in the second information data.

11. The method of claim 1, wherein computing the output mid-tones value further comprises:
- determining a preliminary output mid-tones value in the second dynamic range, and first and second bounding values for the preliminary output mid-tones value, based on the first information data and the first output black point;
- computing a head offset and a tail offset in the second dynamic range based on the preliminary output mid-tones value, the first and a second bounding values, and one or more input contrast preservation values; and
- computing the output mid-tones value in the second dynamic range based on the input mid-tones level in the first dynamic range and the head and tail offsets.

12. The method of claim 11, wherein determining the preliminary output mid-tones value and the first and second bounding values for the first output mid-tones value, comprises computing $$midLoc=(SMid-TminPQ)/TDR;$$

$$headroom=(SMax-SMid)/TDR;$$

$$tailroom=(SMid-SMin)/TDR;$$

wherein $$TDR=TmaxPQ-TminPQ,$$

midLoc denotes the preliminary output mid-tones value, tailroom and headroom denote the first and second bounding values for the first output mid-tones value, SMin, SMid, and SMax denote the first information data, and TminPQ denotes the first output black point level.

13. The method of claim 11, wherein at least one contrast preservation value is approximately 50%.

14. The method of claim 11, wherein computing the output mid-tones value (TMid) comprises computing $$TMid=SMid-offsetHead+offsetTail,$$

wherein SMid denotes the input mid-tones level in the first dynamic range, and offsetHead and offsetTail denote the head and tail offsets.

15. The method of claim 14, wherein computing the second output white point and the second output black point in the second dynamic range comprises computing $$TMax=min(TMid+SMax-SMid,TmaxPQ),$$

$$TMin=max(TMid-SMid+SMin,TminPQ,$$

wherein TMin denotes the second output black point, TMax denotes the second output white point, SMin and SMax denote the input black point level and the input white point level in the first dynamic range, and TminPQ and TmaxPQ denote the first output black point and the first output white point in the second dynamic range.

16. The method of claim 10, further comprising computing a maximum value of the tail slope (maxMinSlope) and/or a maximum value of the head slope (maxMaxSlope) as $$maxMinSlope=3*(TMid-TMin)/(SMid-SMin),$$

$$maxMaxSlope=3*(TMax-TMid)/(SMax-SMid),$$

wherein optionally:
computing the tail slope (slopeMin), the mid-tones slope (slopeMid), and the head slope (slopeMax) further comprises computing $$slopeMin=min([maxMinSlope,((TMid-TMin)/(SMid-SMin))^2]);$$

$$slopeMax=min([maxMaxSlope,1,((TMax-TMid)/(SMax-SMid))^4]);$$

$$slopeMid=min([maxMinSlope,maxMaxSlope,contrastFactor*(1-SMid+TMid)]);$$

wherein contrastFactor denotes a contrast parameter.

17. The method of claim 1, further comprising determining a backward look-up table to map an image from the second dynamic range back to the first dynamic range, the method comprising:
- determining a forward look-up table mapping a plurality of x(i) values in the first dynamic range to y(i) values in the second dynamic range based on the determined transfer function; and
- generating the backward look-up table mapping a plurality of y'(k) values in the second dynamic range to corresponding x'(k) values in the first dynamic range by setting:
  if y'(k)=y(i), then x'(k)=x(i)
  otherwise
  if y(i)<y'(k)<y(i+1), then the corresponding output x'(k) is generated by interpolating a value between x(i) and x(i+1).

18. An apparatus comprising a processor configured to perform the method recited in claim 1.

19. A non-transitory computer-readable storage medium having stored thereon computer-executable instruction for executing a method with one or more processors in accordance with claim 1.

* * * * *